(No Model.)
N. WEBSTER.
MOLD FOR BUNDLING FISH OR FISH FLESH.
No. 245,679. Patented Aug. 16, 1881.
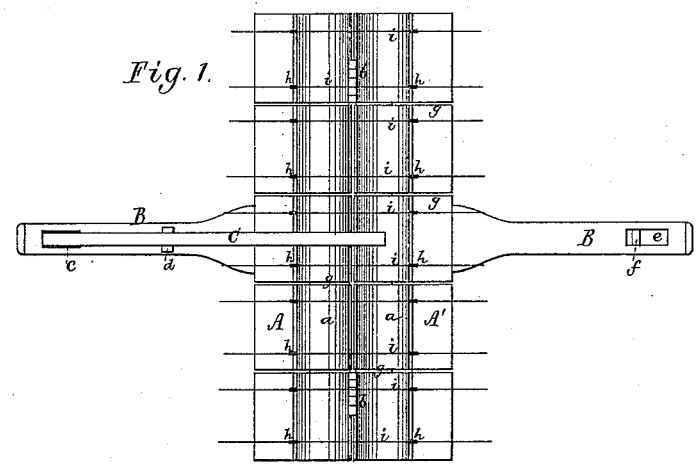
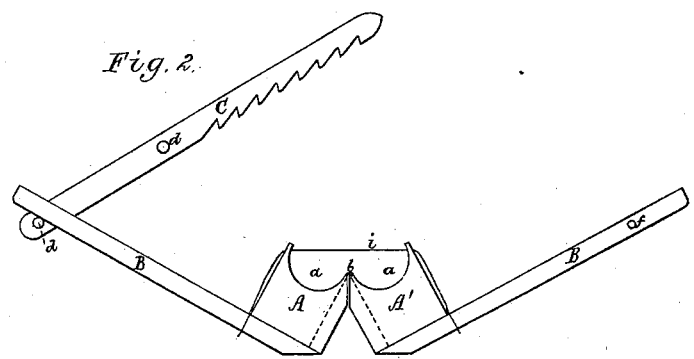
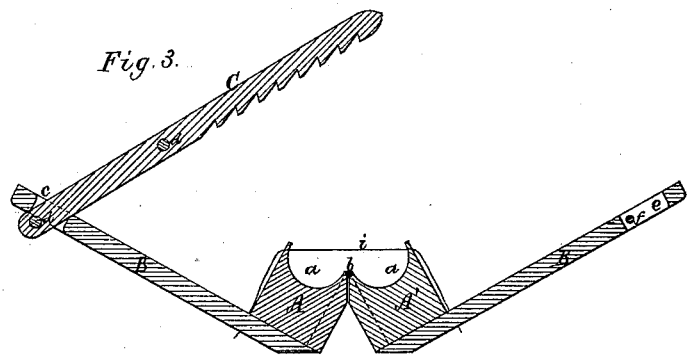
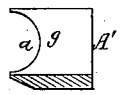
Witnesses.
S. N. Piper
E. B. Pratt
Inventor.
Nathaniel Webster.
by R. H. Eddy atty.

UNITED STATES PATENT OFFICE.

NATHANIEL WEBSTER, OF GLOUCESTER, MASSACHUSETTS.

MOLD FOR BUNDLING FISH OR FISH-FLESH.

SPECIFICATION forming part of Letters Patent No. 245,679, dated August 16, 1881.

Application filed July 5, 1881. (No model.)

*To all whom it may concern:*

Be it known that I, NATHANIEL WEBSTER, of Gloucester, of the county of Essex and State of Massachusetts, have invented a new and useful Mold for Bundling Fish or Fish-Flesh; and I do hereby declare the same to be described in the following specification, and represented in the accompanying drawings, of which—

Figure 1 is a top view of the mold as open and ready for receiving the fish-flesh. Fig. 2 is an end elevation of it. Fig. 3 is a medial and transverse section of it. Fig. 4 is a transverse section of one of its jaws, the plane of section being through one of its cutting-kerfs.

The nature of my invention is duly set forth in the claim hereinafter presented.

In such drawings, A A' are two long jaws of suitable material, each of which is grooved lengthwise, in manner as shown at $a$, the groove having either a semicircular or semi-polygonal transverse section. These two jaws are hinged together, the hinges being shown at $b$ $b$, and there is fixed to and extended from each jaw, at its middle, a handle, B.

A catch-bar, C, serrated or toothed, as shown, is adapted to slide in a slot, $c$, made in one of the said handles, such catch-bar having studs $d$ projecting from it, and arranged in it, as represented. There is in the other handle a slot, $e$, provided with a catch-pin, $f$, which goes through it and the handle transversely, and is arranged as shown in Fig. 3.

The studs are to keep the bar in connection with its handle and to allow of the bar being slid back in the handle so as not to interfere with or be in the way of the introduction of the fish-flesh into the mold when the latter is open.

At equal distances apart from each other there are in each of the jaws cutting-kerfs $g$, each of which is arranged transversely in its jaw and across its groove $a$, and is somewhat deeper than the groove. Each of such kerfs $g$ of each jaw is in line with or directly opposite one of the other jaws, as shown. Furthermore, there are in each jaw and between each two next adjacent kerfs $g$ thereof two shallower kerfs or notches, $h$ $h$, their purpose being to receive and hold strings $i$ $i$ for binding together the combined fish-flesh.

The mold, as described, is to compress fish and form it into fasces or bundles of like weight and size.

In using the mold it is to be first opened and supplied with twines or strings laid loosely across it in its string-receiving kerfs. This having been done, the space between the grooves of the jaws is to be charged with the fish-flesh in strips, it being laid upon the twines or strings. Next, the attendant should lay hold of the handles and force them toward each other, so as to close the jaws and closely compress the charge of fish-flesh, and expel as much as possible therefrom the air between the strips. Next, the catch-bar is to be introduced into the slot $e$ and caught upon its pin $f$, so as to hold the jaws in their closed condition. The several strings are next to be drawn tightly and tied around the mass of compacted flesh, after which a cutting-knife or suitable implement is to be passed down through each of the cutting-kerfs, so as to separate the molded mass of flesh into sections equal in length and weight. This having been effected, the mold is to be opened, or the jaws forced apart, and the sections are to be removed from them.

I claim as my invention—

The fish-flesh mold, substantially as described, consisting of the two jaws hinged together, grooved lengthwise, and provided with the cutting and string kerfs, and the handles and catch-bar, all being arranged and adapted essentially and for the purpose as explained.

NATHANIEL WEBSTER.

Witnesses:
R. H. EDDY,
E. B. PRATT.